(12) United States Patent
Lloyd et al.

(10) Patent No.: US 7,422,464 B2
(45) Date of Patent: Sep. 9, 2008

(54) MECHANISM FOR DELATCHING SMALL SIZE PLUG CONNECTORS

(75) Inventors: Brian Keith Lloyd, Maumelle, AR (US); Cleaver Brinkerhoff, Park ridge, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/179,003

(22) Filed: Jul. 7, 2005

(65) Prior Publication Data

US 2006/0019525 A1 Jan. 26, 2006

Related U.S. Application Data

(60) Provisional application No. 60/586,125, filed on Jul. 7, 2004.

(51) Int. Cl.
*H01R 13/627* (2006.01)
(52) U.S. Cl. .................. 439/352; 439/357; 385/53
(58) Field of Classification Search ............... 439/352, 439/357, 358; 385/53, 92
See application file for complete search history.

(56) References Cited

U.S. PATENT DOCUMENTS

| | | | |
|---|---|---|---|
| 5,344,194 A | 9/1994 | Hatagashi et al. | |
| 5,564,939 A | 10/1996 | Maitani et al. | |
| 5,634,809 A | 6/1997 | Hirad | |
| 5,741,150 A | 4/1998 | Stinson et al. | |
| 5,915,987 A | 6/1999 | Reed et al. | |
| 6,234,828 B1 | 5/2001 | Kuo | |
| 6,371,787 B1 | 4/2002 | Branch et al. | |
| 6,382,995 B1 | 5/2002 | Bricaud et al. | |
| 6,430,053 B1* | 8/2002 | Peterson et al. | 361/728 |
| 6,434,015 B1 | 8/2002 | Hwang | |
| 6,589,066 B1 | 7/2003 | Wu | |
| 6,592,391 B1 | 7/2003 | Wu | |
| 6,641,425 B1 | 11/2003 | Wu | |
| 6,648,665 B1 | 11/2003 | Wu | |
| 6,648,666 B1 | 11/2003 | Wu | |
| 6,659,790 B1 | 12/2003 | Wu | |
| 6,722,912 B2 | 4/2004 | Wu | |
| 6,746,158 B2* | 6/2004 | Merrick | 385/53 |
| 6,749,448 B2* | 6/2004 | Bright et al. | 439/160 |
| 6,824,416 B2* | 11/2004 | Di Mascio | 439/352 |
| 6,885,560 B2* | 4/2005 | Zaremba | 361/754 |
| 2002/0142649 A1 | 10/2002 | Baugh et al. | |
| 2003/0198025 A1 | 10/2003 | Cao | |
| 2004/0077226 A1 | 4/2004 | Murr et al. | |
| 2006/0009080 A1 | 1/2006 | Regnier et al. | |

(Continued)

OTHER PUBLICATIONS

International Search Report in International Application No. PCT/US2005/024478, Oct. 25, 2005.

*Primary Examiner*—Truc T. Nguyen
*Assistant Examiner*—X. Chung-Trans
(74) *Attorney, Agent, or Firm*—Thomas D. Paulius

(57) ABSTRACT

A plug connector for engaging a housing on a circuit board is described. The housing includes a pair of engagement tabs that are bent inwardly of the housing at an angle thereto and these tabs engage openings formed in the body of the plug connector. The tabs rest in the openings and may be released by way of a delatching mechanism that is part of the plug connector. This mechanism includes a handle and two arms that extend lengthwise. The arms end in cam blocks that contact and lift the engagement ends out of the plug connector shell openings to unlatch the plug connector from the housing.

17 Claims, 17 Drawing Sheets

U.S. PATENT DOCUMENTS

| | | |
|---|---|---|
| 2006/0014438 A1 | 1/2006 | Regnier |
| 2006/0040556 A1 | 2/2006 | Neer et al. |
| 2006/0134961 A1 | 6/2006 | Regnier et al. |
| 2006/0134985 A1 | 6/2006 | Reed et al. |
| 2006/0258201 A1 * | 11/2006 | Schwiebert et al. ......... 439/352 |

* cited by examiner

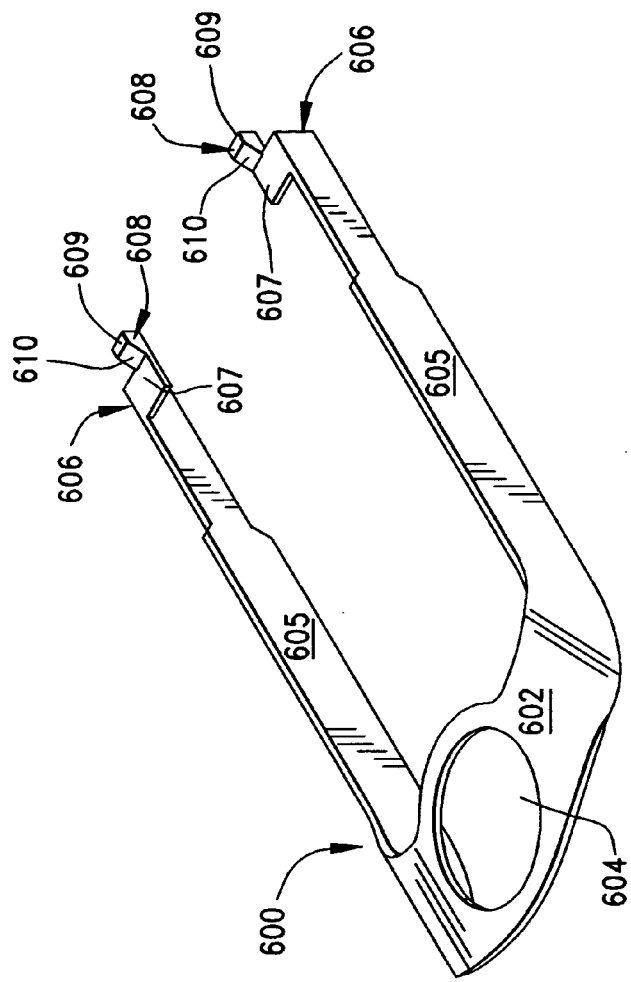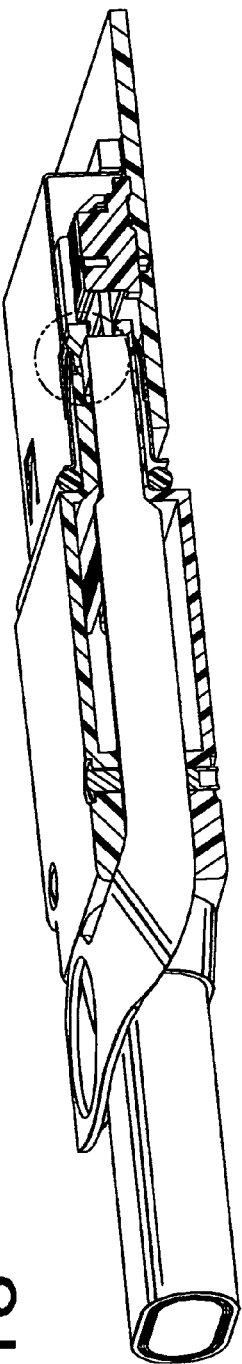
FIG.14
FIG.16

MECHANISM FOR DELATCHING SMALL SIZE PLUG CONNECTORS

REFERENCE TO RELATED APPLICATIONS

This application claims priority from prior U.S. Provisional Patent Application No. 60/586,125, filed Jul. 7, 2004.

BACKGROUND OF THE INVENTION

The present invention is directed generally to small size connectors and to shielded housings that enclose such connectors, and more particularly toward plug connectors that are received within such housings and which mate with such small size connectors.

High speed data transfer systems require electrical connectors in which the electrical impedance can be controlled in order to maintain the required data transfer rate of the electrical system. Low profile connectors, such as those used in SFP (Small Form Factor Pluggable) and SFP-like applications are desired in electronic devices in which space is a premium. With smaller spaces and sizes, it is difficult to ensure that the shielded housings are large enough to provide an opposing mating connector of the plug type that secures engages the shield housing surrounding the circuit board connector.

The present invention is therefore directed to an improved plug connector for use with SFP connectors of reduced size that overcomes the aforementioned shortcomings and which provides a means for latching the plug connector to a shielded housing associated with and encompassing the SFP connector.

SUMMARY OF THE INVENTION

Accordingly, it is a general object of the present invention to provide a surface mount style connector for mounting on a circuit board, the connector having a plurality of conductive terminals supported therein in spaced apart order, and a conductive outer shielding cage or housing that encompasses the connector and controls electromagnetic interference emission therefrom.

Another object of the present invention is to provide a shielded housing with a connector guide system incorporated therein and which has a shape that permits multiple housings to be spaced close to each other.

A further object of the present invention is to provide a mechanism for disengaging a plug connector that mates with the aforementioned shielded housings, the plug connector having a housing and a disengaging mechanism moveably mounted thereon, the mechanism having a handle portion and at least one actuating portion that is disposed on the free end of an arm that extends lengthwise through the plug connector, the actuating portion being moveable between first and second operative positions which correspond to respective latched and unlatched conditions of the plug connector.

Still an additional object of the present invention is to provide a delatching mechanism for a reduced size connector, the connector having a housing, a circuit card extending forwardly out of the housing, a delatching assembly at least partially disposed within the housing, the delatching assembly having a rear handle portion and two arms that extend forwardly from the handle portion, the arms terminating in free ends, and each of the free ends including a cam block, or deflector portion that is aligned with a corresponding engagement tab disposed on an opposing shielded housing.

Yet a further object of the present invention is to provide an unlatching mechanism as mentioned immediately above in which the plug connector includes a conductive outer shell that at least partially encompasses the circuit card, the shell having a pair of T-shaped openings disposed therein, the delatching arm cam blocks being aligned with these openings and at least being partially received therein, the shielded housing engagement tabs depending downwardly at an angle toward an interior space of the shielded housing, the T-shaped openings and the cam blocks being aligned with the engagement tabs, whereby actuation of the delatching assembly urges the cam blocks into contact with the engagement tabs to thereby move them out of engagement with the shell of the plug connector.

The present invention accomplishes the aforementioned and other objects by the way of its novel and unique structure.

In the present invention, an elongated assembly is provided as part of the plug connector that engages the shielded housing and mates with the SFP-style circuit board connector. The assembly has a handle portion that is disposed at a rear end thereof, and two arms extend forwardly therefrom in a spaced-apart fashion through the housing of the plug connector. The two arms are capable of linear movement in this embodiment and move forwardly and rearwardly within the housing of the plug connector. The two free ends of the arms extend forwardly from the plug connector housing into the area that is partially bounded by the conductive metal shell disposed at the forward end of the plug connector.

The free ends of the arms each preferably include a cam block portion that has an upwardly angled cam surface disposed thereon. Openings that preferably include T-shapes are formed in the plug connector shell and the cam block are aligned with these holes and partially reside within portions of the openings. When the handle of the assembly is pulled, the free ends of the arms and the cam blocks are moved between first and second operative positions. In one of the two positions, the cam blocks are in a rest position and in the other of the two positions, the cam blocks are urged against engagement members of the shielded housing.

The shielded housing includes one or more engagement members that are formed as tabs which may be stamped from the shielded housing. These engagement tabs are bent inwardly at an angle and are angled downwardly into the shielded housing interior and extend at a downward angle toward the rear of the shielded housing and serve to latch the plug connector in place in connection with the connector enclosed within the housing. These engagement tabs are aligned with the T-shaped openings of the plug connector and the cam blocks of the latching mechanism. The engagement tabs extend into the T-shaped openings when the plug connector is fully engaged with the shielded housing and so prevent the plug connector from working free from engagement with the circuit board connector. The cam blocks are moveable, in a linear fashion, within the T-shaped openings, and their angled surfaces may be moved against the engagement tabs, lifting them up and out of engagement with the plug connector to unlatch the plug connector from engagement with the housing, so that the plug connector may be easily removed.

These and other objects, features and advantages of the present invention will be clearly understood through a consideration of the following detailed description.

BRIEF DESCRIPTION OF THE DRAWINGS

In the course of this detailed description, the reference will be frequently made to the attached drawings in which:

FIG. 14 is a perspective view of the delatching mechanism used in the plug connector of FIG. 14;

FIG. 16 is a cross-sectional view of the plug connector of FIG. 13, taken along a line that permits view of the delatching arm free ends;

DETAILED DESCRIPTION OF THE PREFERRED EMBODIMENTS

Figure 1:
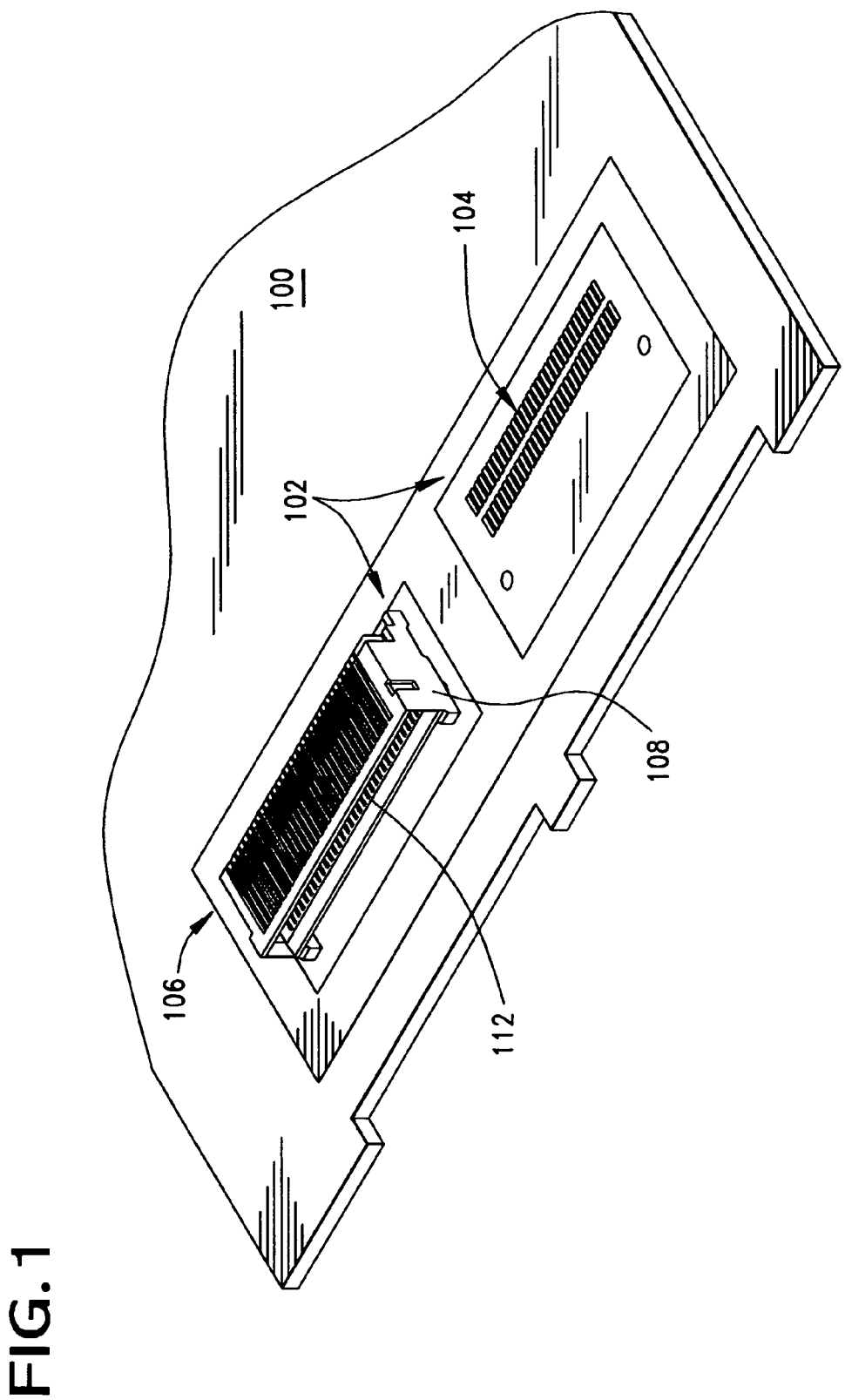
FIG. 1 is a perspective view of a circuit board with two arrangements of conductive contact pads disposed thereon and with a SFP-style connector mounted to one of the two contact pad arrangements.
Figure 6:
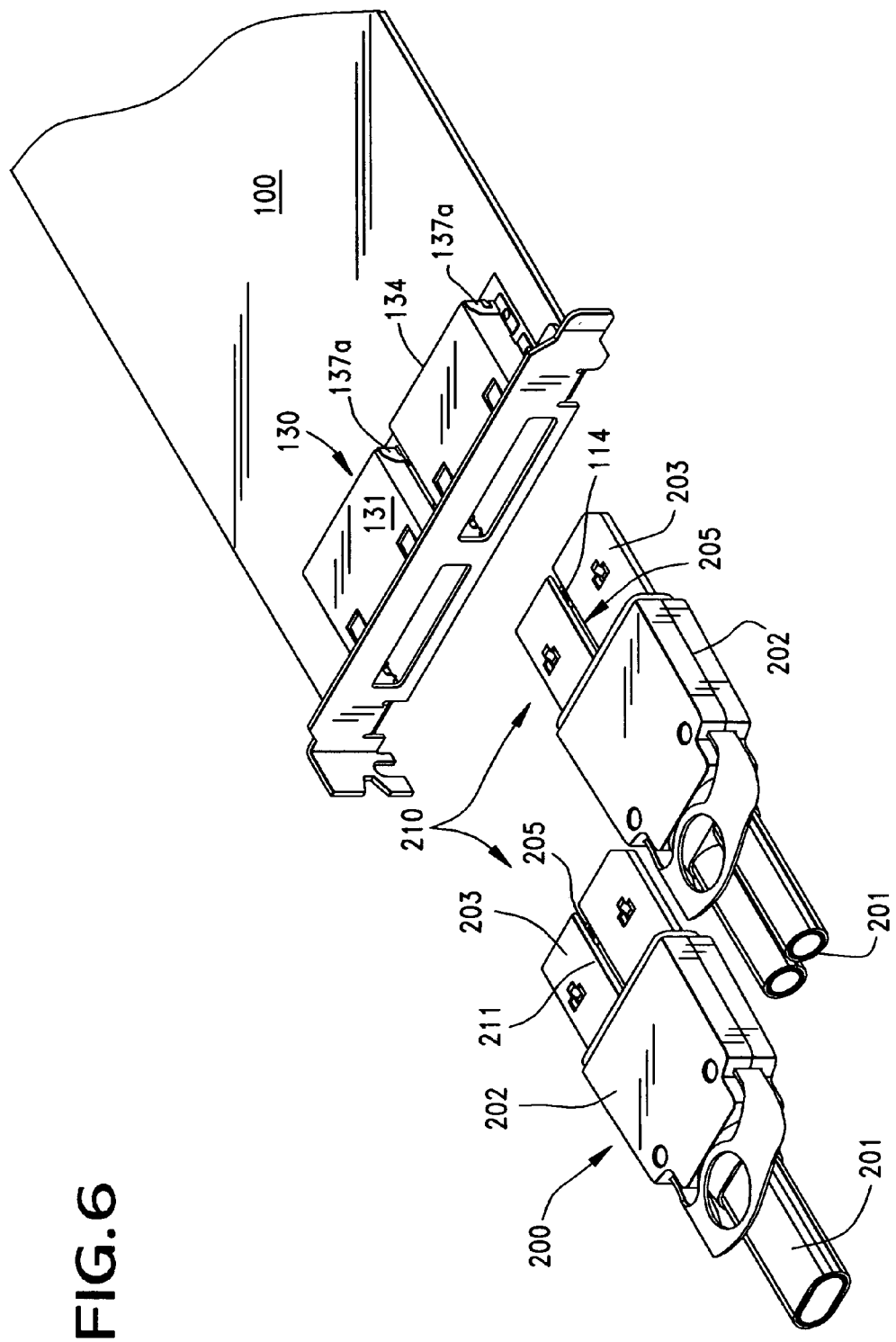
FIG. 6 is a the same view as FIG. 5, but with a mounting bracket in place across the two shield housings and with two opposing mating plug connectors shown removed from engagement with the SFP-style connectors.

FIG. 1 illustrates the environment in which the shield housings of the invention are used. The environment shown includes a planar circuit board 100, with two designated connector areas 102 defined therein, each including a plurality of conductive contact pads 104. One such area has a SFP-style connector 106 in place. This connector 106 has an insulative housing 108 and supports a plurality of conductive terminals 110. Such a connector 106 typically includes a slot 112 that is intended to receive the edge of a circuit card 114 (FIG. 6) that is mounted to an opposing mating plug-style connector 200. (FIG. 6.)

Figure 2:
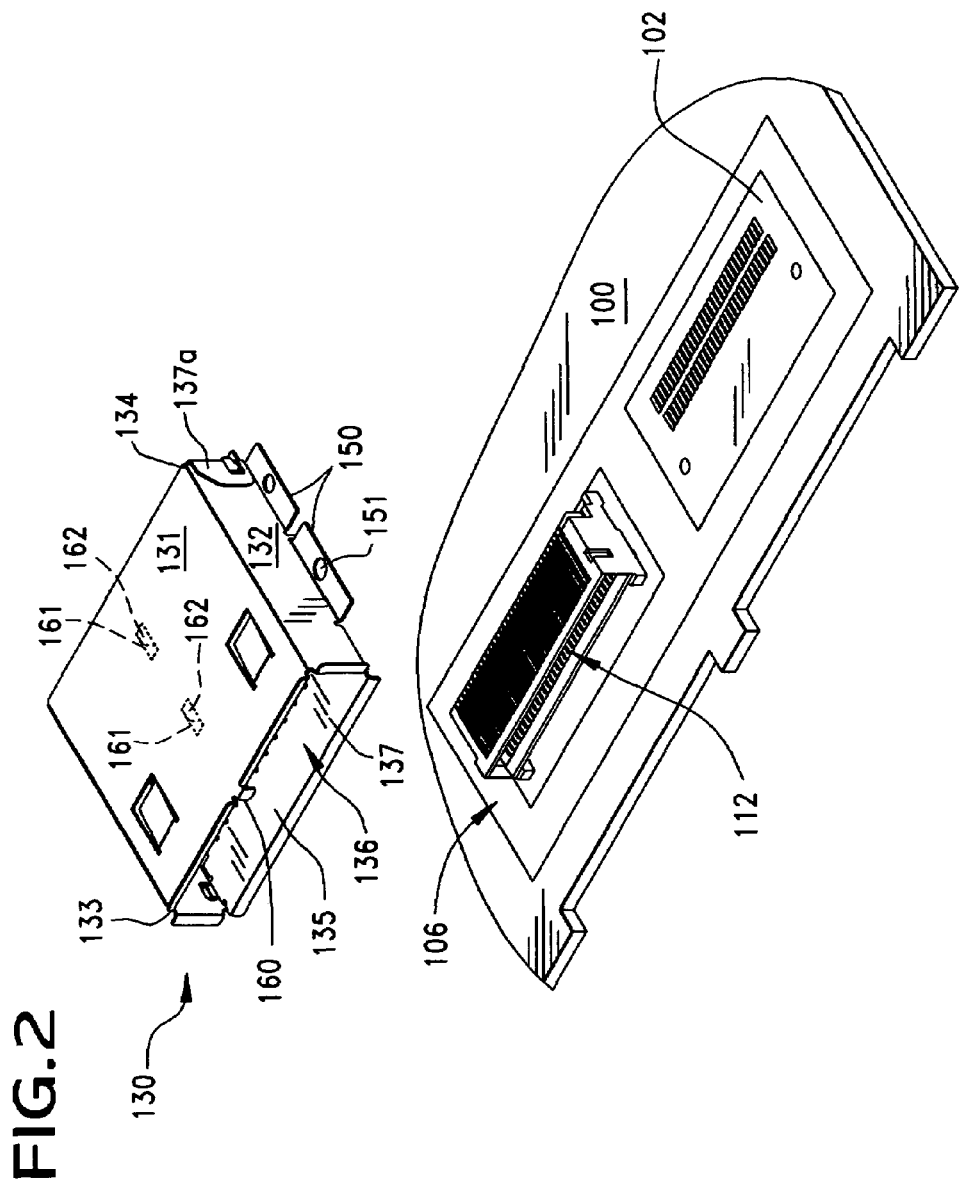
FIG. 2 is a the same view as FIG. 1, but with a shield housing constructed in accordance with the principles of the present invention shown removed away from and above the circuit board.

FIG. 2 illustrates one embodiment of a shield housing 130 constructed in accordance with the principles of the present invention. A illustrated, the shield housing 130, is preferably formed from a sheet metal blank through a suitable process, such as a stamping and forming process. In this regard, it includes a top wall 131, two side walls 132, 133, a back wall 134 and a bottom wall 135. These walls are all combined to collectively define an opening 136 that leads to a hollow interior cavity 137. The back wall 134 may include a pair of flange ends 137a, which are bent over upon each of the side walls 132, 133 to secure the back wall to the housing and to seal off the rear of the internal cavity 137. The bottom wall 135 is preferably formed as only a partial bottom wall which does not extend completely back to the rear wall 134. Rather, it has a depth that is less than the depth of the entire housing to define an opening 139 on the bottom of the housing 130 which may be placed over the SFP-style connector 106 with which it is used. The bottom wall 135 may have an engagement flange 140 formed at an end thereof, which is bent at an angle and which engages a corresponding opposing engagement tab 141 formed on side wall 133 to secure a framework for the entrance of the shield housing 130

Figure 3:
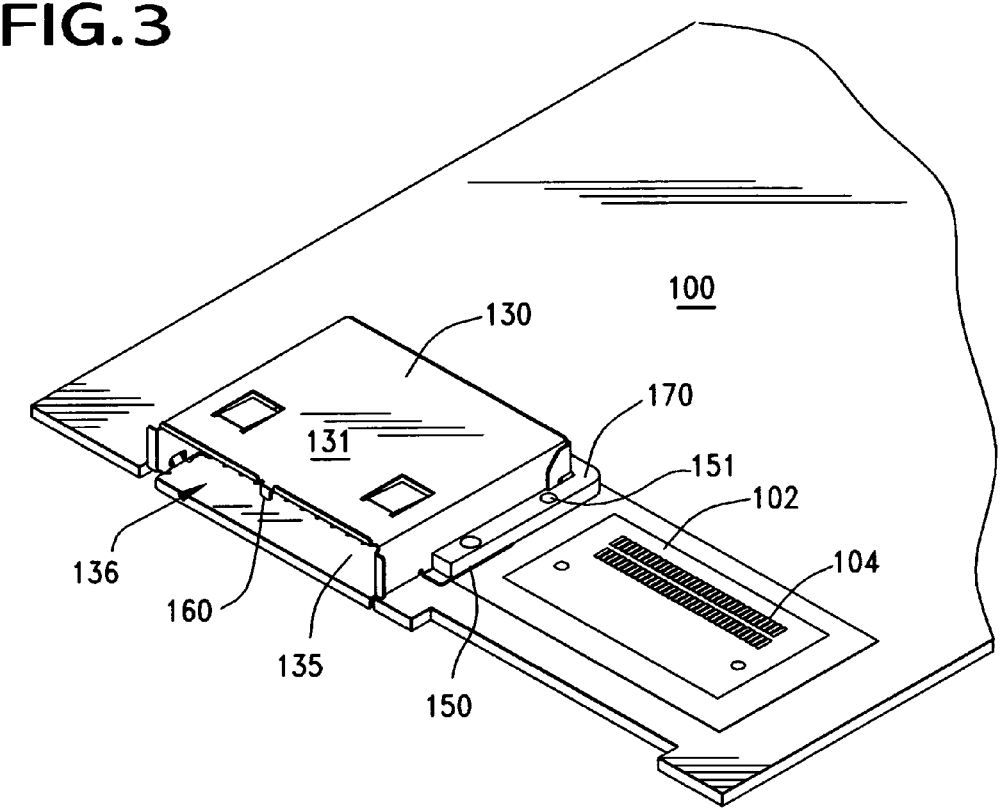
FIG. 3 is a same view as FIG. 2, but with the shield housing shown in place upon the circuit board and encompassing the SFP-style connector.
Figure 4:
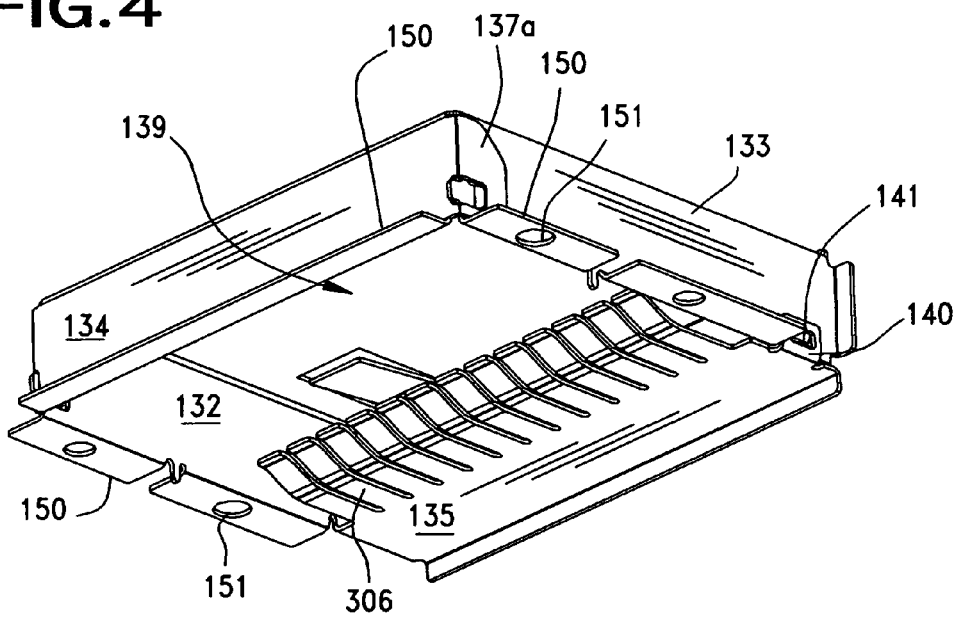
FIG. 4 is a perspective view, taken from underneath, of the shield housing of FIGS. 2 & 3.
Figure 5:
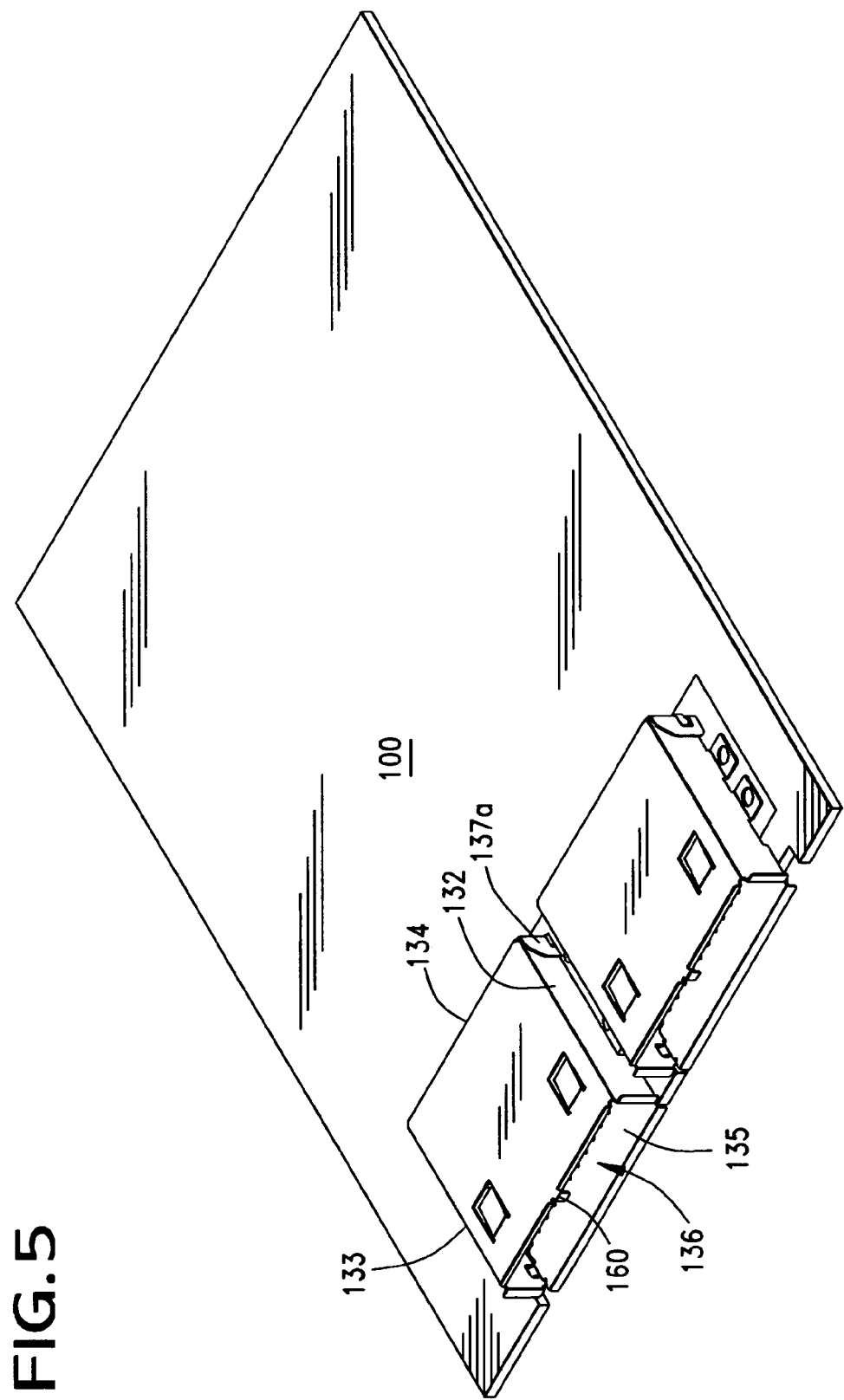
FIG. 5 is the same view as FIG. 4, but with a second shield housing mounted adjacent to the first shield housing.

As shown best in FIG. 4, the housing 130 may also include a series of flanges 150 formed along the side walls 132, 133 or back wall 134 that are bent at an angle in order to provide a flat mounting surface that opposes the top surface of the circuit board 100. These flanges 150 may include openings 151 that receive screws or bolts (not shown) for attachment to the circuit board or they may be flat for soldering to the board 100. A U-shaped EMI gasket 170 may be placed over these flanges 150 as shown in FIG. 3 to prevent EMI leakage from the sides and rear of the housing 103.

Turning to FIG. 2, in an important aspect of the present invention, the housing 130 includes a means for guiding the opposing mating connector 200 into the internal cavity 139 of the housing 130. This guide means may also be referred to as a "keying" means and is shown in the first embodiment as a guide tab 160 that is formed along the front edge of the housing entrance 136. Although only one such guide tab 160 is illustrated, it will be understood that additional guide tabs 162 may be formed in the top wall 131 of the housing 130. Such tabs 162 may be formed by making a U-shaped opening 161 in the top wall 131 to define the edges of the guide tab 162, and subsequently bending the guide tabs 162 down into the internal cavity 137 of the housing 130. The guide tab 160 (or tabs 162) define a positioning point for the opposing mating connector 200. The tabs 160, 162 are preferably aligned along an imaginary line that extends toward the rear of the housing 130.

Figure 7:
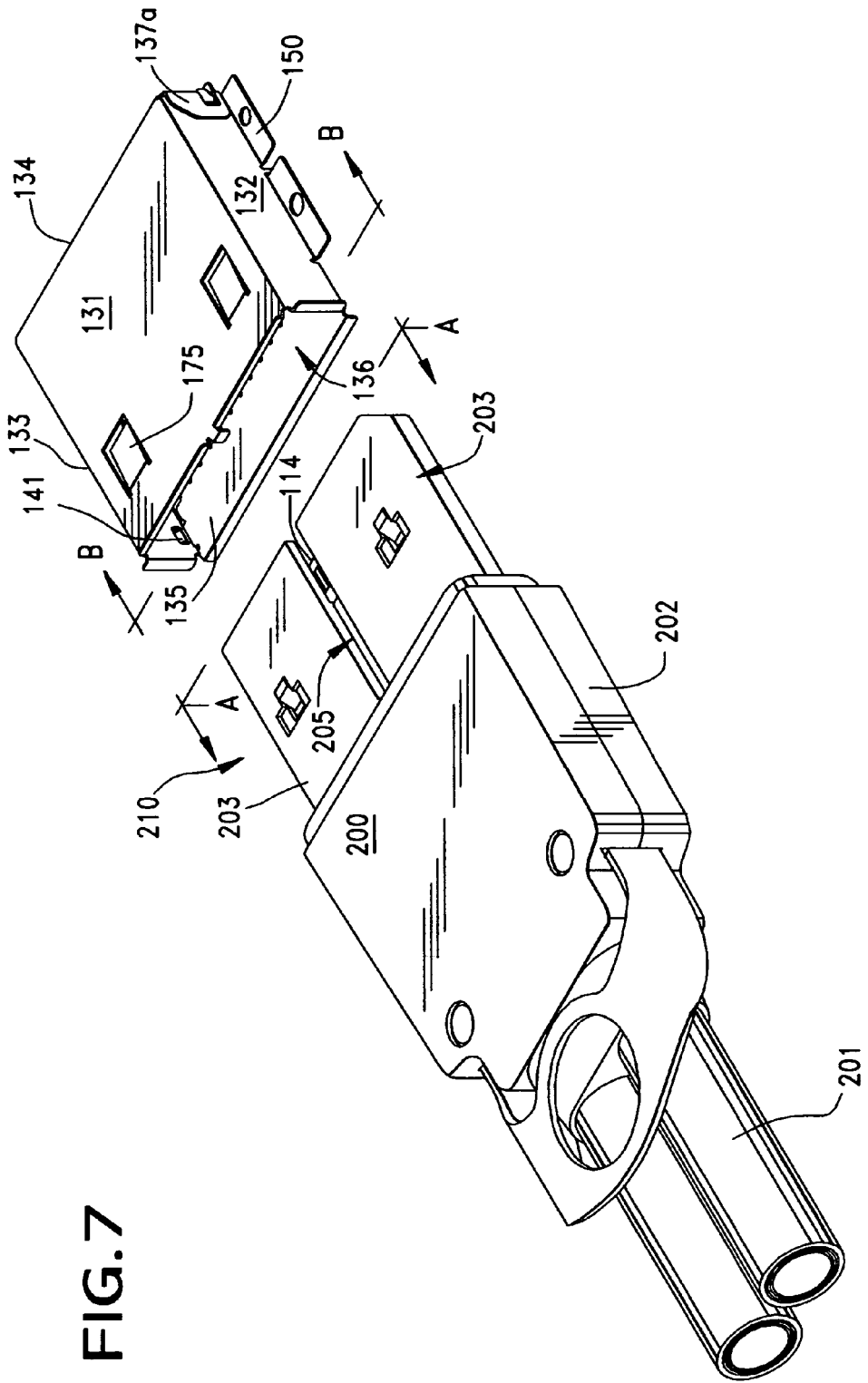
FIG. 7 is an enlarged perspective view of the connector housing of FIG. 4 and an opposing mating connector of FIG. 6 shown in alignment with each other.
Figure 7A:
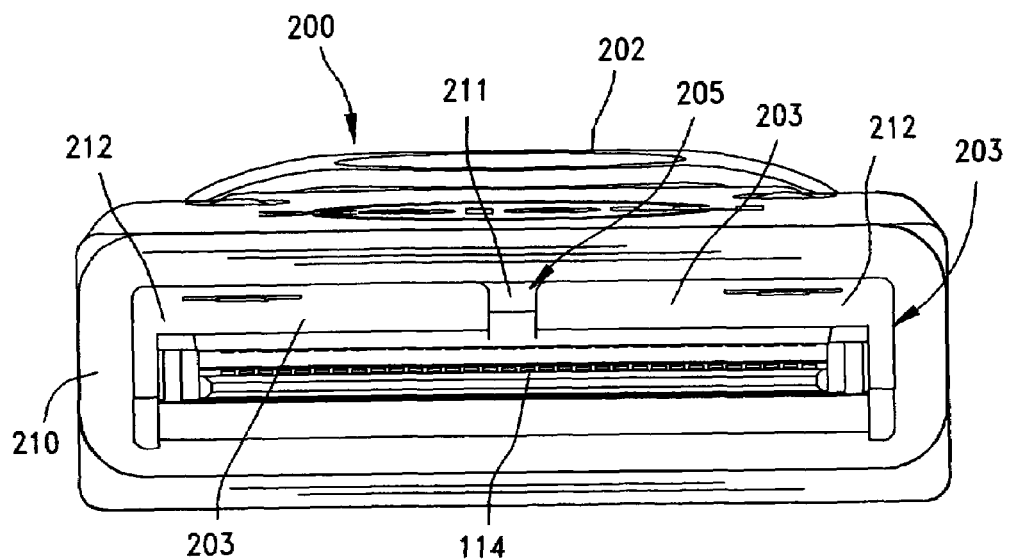
FIG. 7A is an elevational view of the front end of the opposing mating connector, taken along lines A-A of FIG. 7.
Figure 7B:
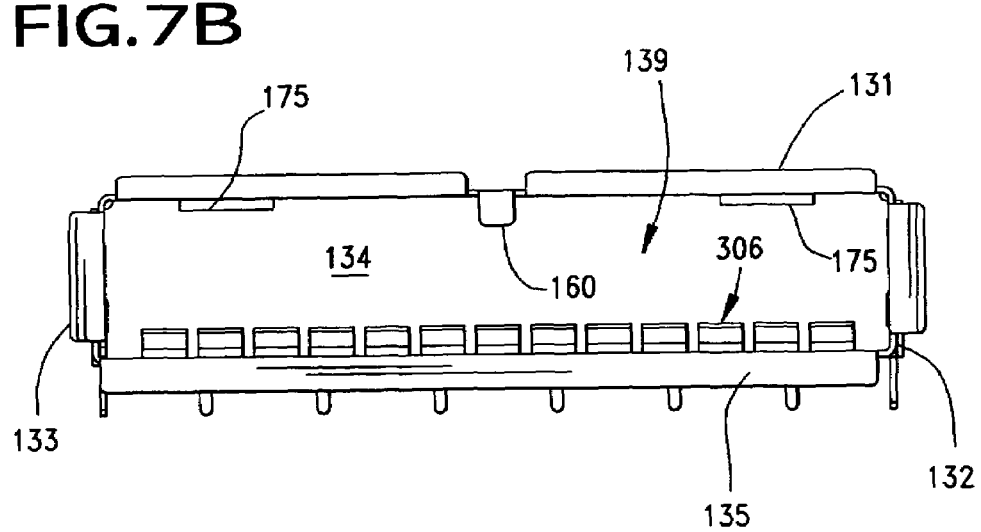
FIG. 7B is an elevational view of the front end of the shield housing of the invention, taken along lines B-B of FIG. 7 and with the shield housing removed from a circuit board and with the interior SFP-style connector removed for clarity.

An opposing connector 200 is illustrated in FIG. 6 and it can be seen that the connector includes a housing 202 that is attached to one or more cables 201, each of which preferably includes a plurality of wires (not shown) that are intended to connect with circuits of the circuit board 100. The connectors 200 include one or more male projecting portions in the form of circuit cards 114 that are received within the circuit card slot 112 of the board connector 106. These projecting portions, as well as the rest of the front end 210 of the connector 200 are encompassed by a conductive shield 203. The shield 203 includes a guide slot 205, that may be formed as either a slot 211 that separates the top portion of the shield 203 into two separate parts 212 (FIG. 7A), or as a recess, or channel, in the top portion of the plug connector shield 203, in which case, the top portion will not be divided into top separate portions. This guide slot 205, as shown in FIGS. 6 & 7, preferably extends the length of the plug connector.

Alternatively, the entire shield housing 130 may be integrally formed as a single die cast piece, with the guide tabs 160, 162 formed as part of the casting process, rather than being stamped from the top portion of the housing 130. In such an embodiment, the guide tabs may extend for the entire depth of the connector. In all of the embodiments of the shielded housing described herein, it is desirable to have some sort of means of engaging the opposing plug connector in place within the housing. Such an engagement means is shown in the drawings as engagement tabs 175 which may be stamped from the top wall 131 of the housing 130 in the embodiments of FIGS. 7 & 8 or they may be cast along with the cover portion 602 of the embodiment of FIGS. 10-12.

Figure 8:
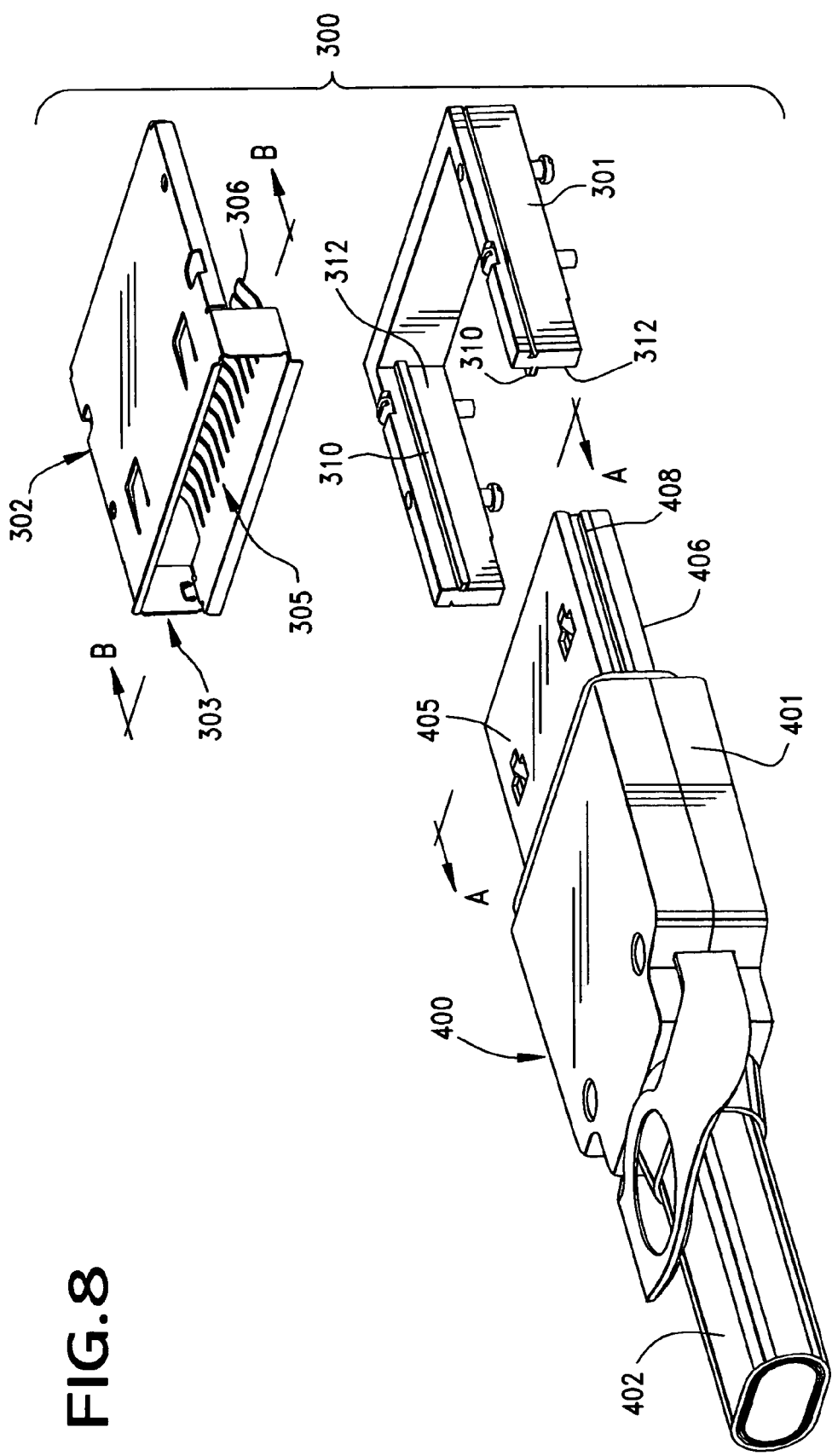
FIG. 8 is an exploded perspective view of another embodiment of a shield housing and mating connector assembly constructed in accordance with the principles of the present invention.
Figure 8A:
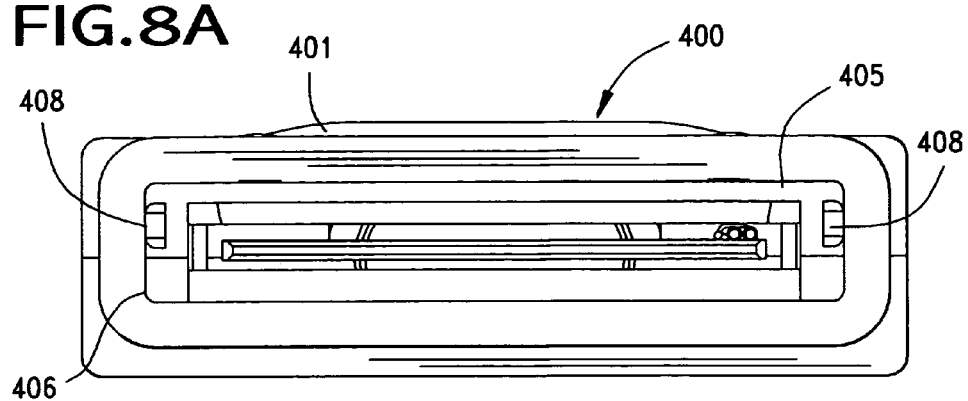
FIG. 8A is an elevational view of the front end of the opposing mating connector, taken along lines A-A of FIG. 8.
Figure 8B:
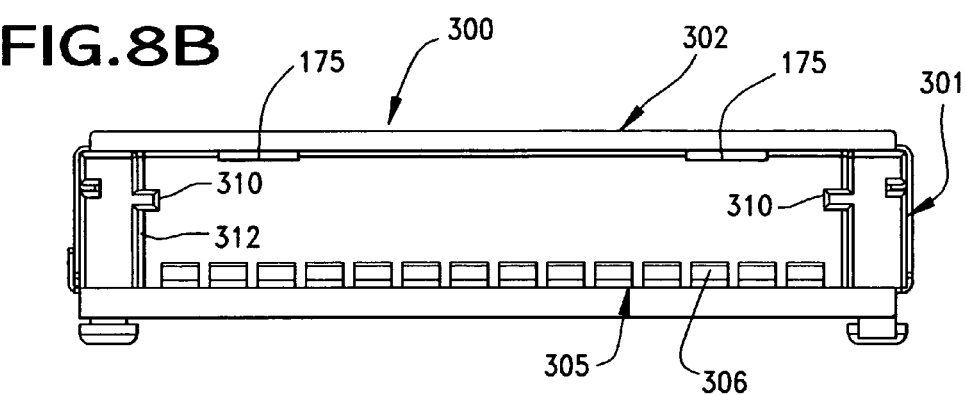
FIG. 8B is an elevational view of the front end of the shield housing of the invention, taken along lines B-B of FIG. 8 and with the shield housing removed from a circuit board and interior SFP-style connector removed for clarity.

FIGS. 8-8B illustrate another embodiment of a shield housing incorporating the principles of the present invention. In this embodiment, the shield housing 300 is formed from multiple pieces including a base portion 301 that is preferably die cast and a cover portion 302 that is preferably stamped and formed from sheet metal. The cover portion 302, as illustrated, includes an entrance portion 303 formed in a manner similar to the entrance 136 of the shield housing 130 described above. This cover portion, like the shield housing 130 also includes an EMI gasket 305 incorporated therein, which takes the form of a metal strip that is slotted to provide a plurality of conductive spring fingers 306 that rise up into the internal cavity of the housing 130, 300 in order to contact a conductive bottom surface of the opposing connector, 200, 400.

The base portion 301 shown in FIG. 8 includes a pair of elongated guide rails 310 that are formed-on the interior surfaces 312 thereof. These rails 310 provide a means for guiding the connector 400 into place within the internal cavity of the housing 300. The opposing connector 400 includes a housing 401 that is attached to a cable 402 and a conductive shield 405 that extends forwardly of the connector housing 401. The shield 405 has grooves 408 formed in its side walls 406 that mate with the guide rails 310 of the housing base side walls. FIGS. 8A & 8B are front elevational views of the plug connector 400 and the shield housing 300, respectively, which illustrate their associated guide rails 310 and the grooves 408.

Figure 9:
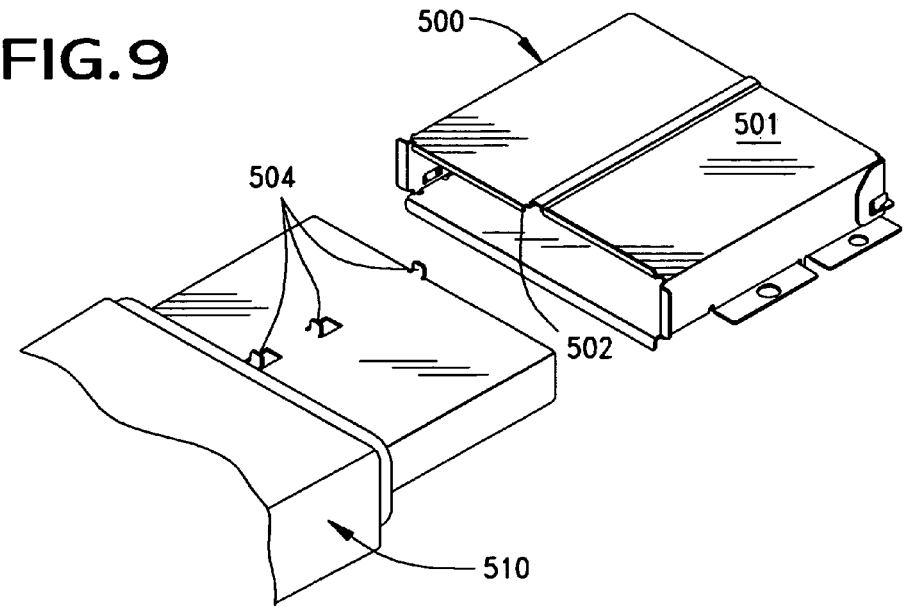
FIG. 9 is a view illustrating another embodiment of a guide mechanism incorporating the principles of the present invention.
Figure 10:
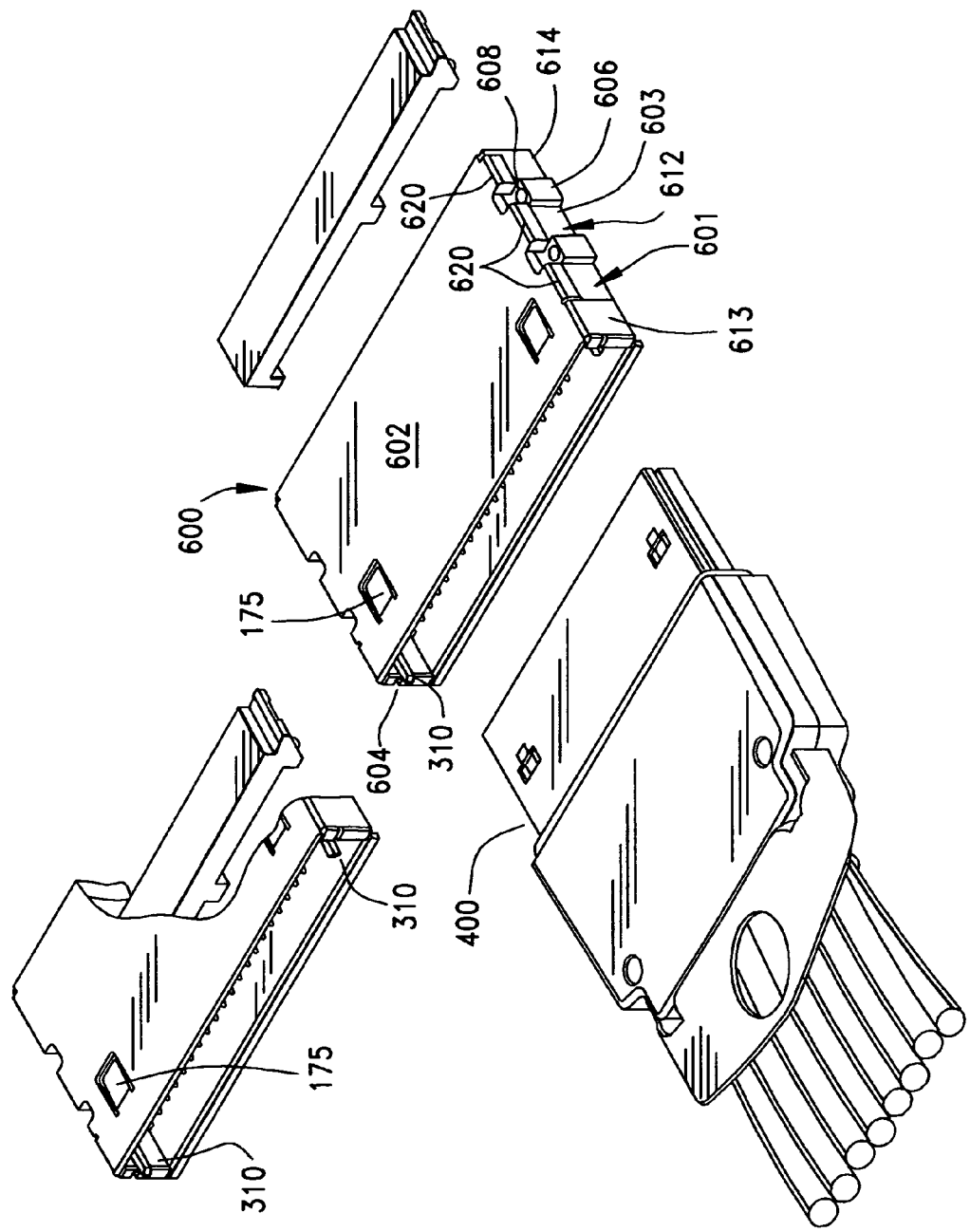
FIG. 10 is an exploded view of another embodiment of a shielded housing assembly incorporating the principles of the present invention.

FIG. 9 illustrates another embodiment of a shielded housing 500 in which the top wall 501 of the housing 500 includes a groove 502 formed therein which extend for the depth of the housing top wall 501. A corresponding opposing connector 510 is provided with one or more guide tabs, or other projections 504 formed in a shield portion 505 of the connector 510 and which are aligned so as to mate with the shielded housing groove 502. FIG. 10 illustrates yet another embodiment of a shielded housing 600 constructed in accordance with the principles of the present invention and which is preferably die cast from a conductive material. The housing 600 includes a base 601 and a top cover portion 602. The base portion 601 includes side walls 603, 604 and each of the side walls 603, 604 includes one or more attachment posts 606 that have screw or bolt holes 608 formed therein into which a bolt or screw may be inserted in order to hold the housing to the circuit board 100. The posts 606 slightly project out from the side walls 603, 604 and thus define a slot 612 therebetween and slots 613, 614 respectively ahead of and behind the posts 606.

Figure 11:
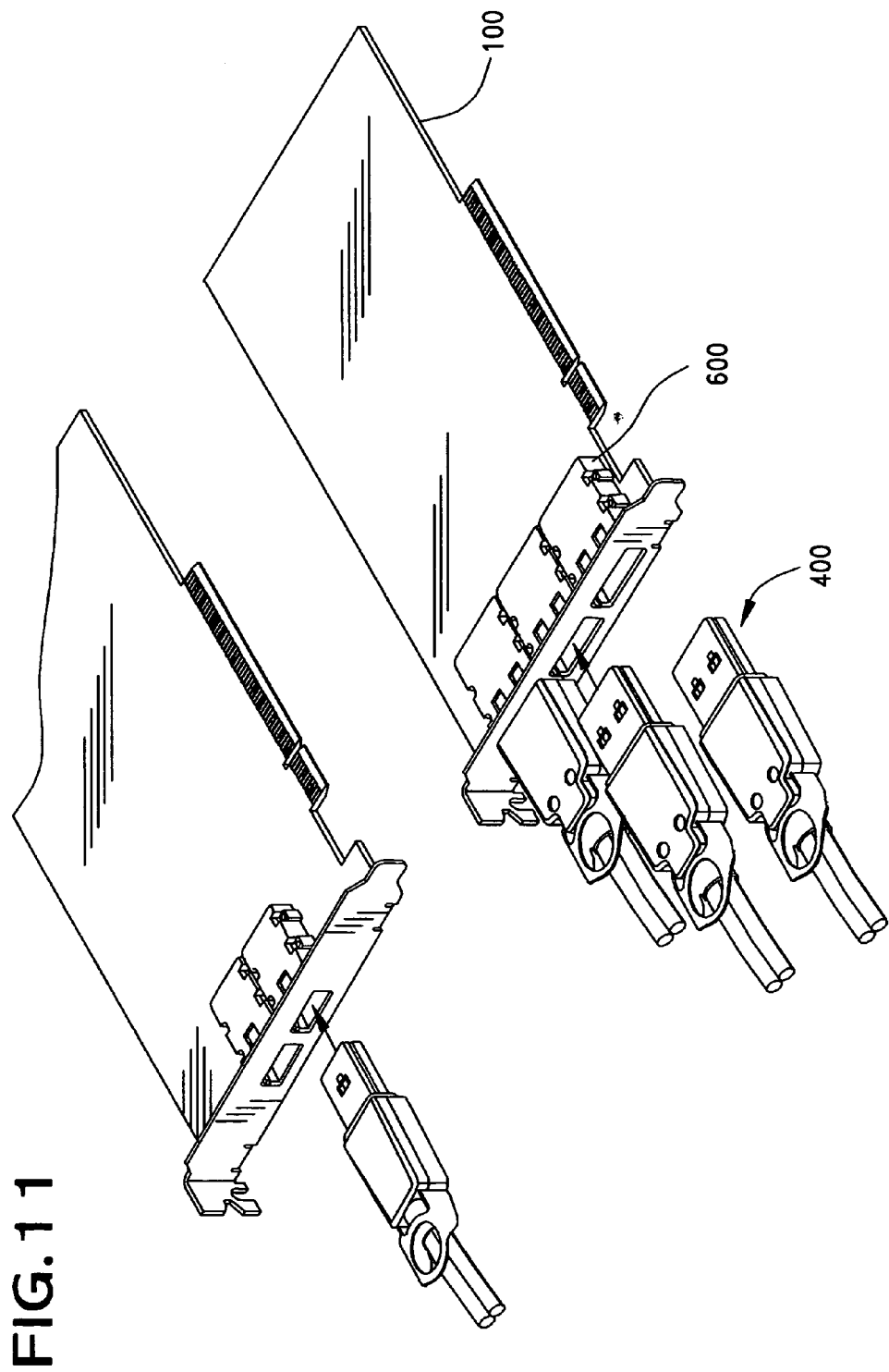
FIG. 11 is a perspective view illustrating a side-by-side arrangement of the shielded housings of FIG. 10.

The posts 606 on each of the sidewalls 603, 604 are staggered in their locations so that two such housing may be placed closely together on a circuit board 100 as shown in FIG. 11. In this regard, the posts 606 on the right side wall 604 will fit in the grooves 612-614 on the left side wall 604 of the shielded housing 600. In order to accommodate an even closer spacing, the grooves 612-614 are preferably recessed, meaning that the cover portion 602 includes top edges 620 that extend slightly out to the side to create a space thereunder into which the outer sides 621 of the posts 606 may fit. This is shown generally in FIG. 11. The housing 600 includes guide rails formed on the interior surfaces of its two side walls in the same manner as described above.

Figure 12:
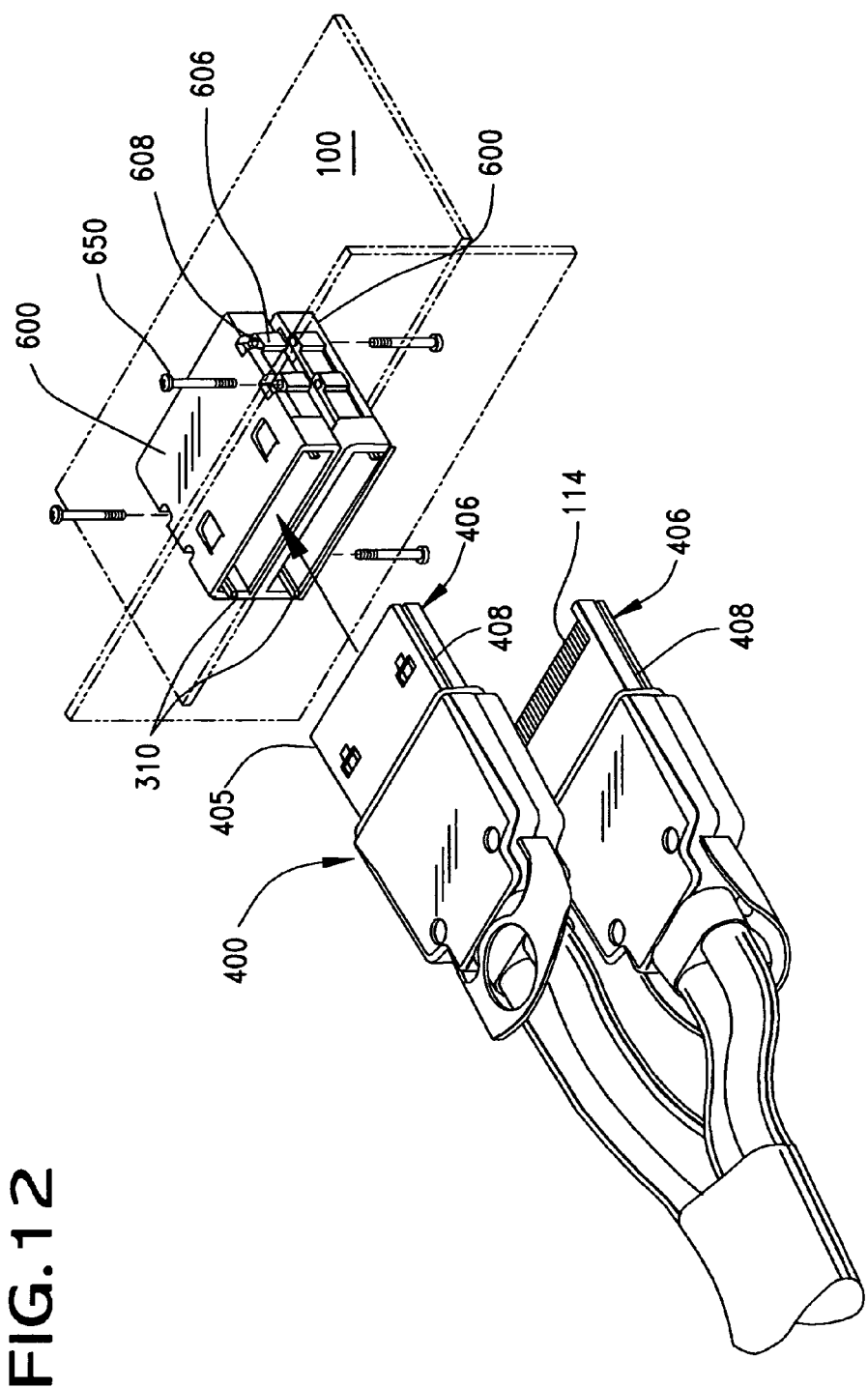
FIG. 12 is a perspective view of two of the housings of FIG. 10 arranged in a belly-to-belly arrangement on opposite sides of a circuit board.

FIG. 12 illustrates two housings 600 of the invention arranged on opposite sides of a circuit board, which is commonly referred to in the art as a "belly-to-belly" arrangement. In this instance, the mounting screws 650 extend through the holes 608 in one set of mounting posts 606 for one housing 600 and into holes in the other set of mounting posts for the other housing.

Figure 13:
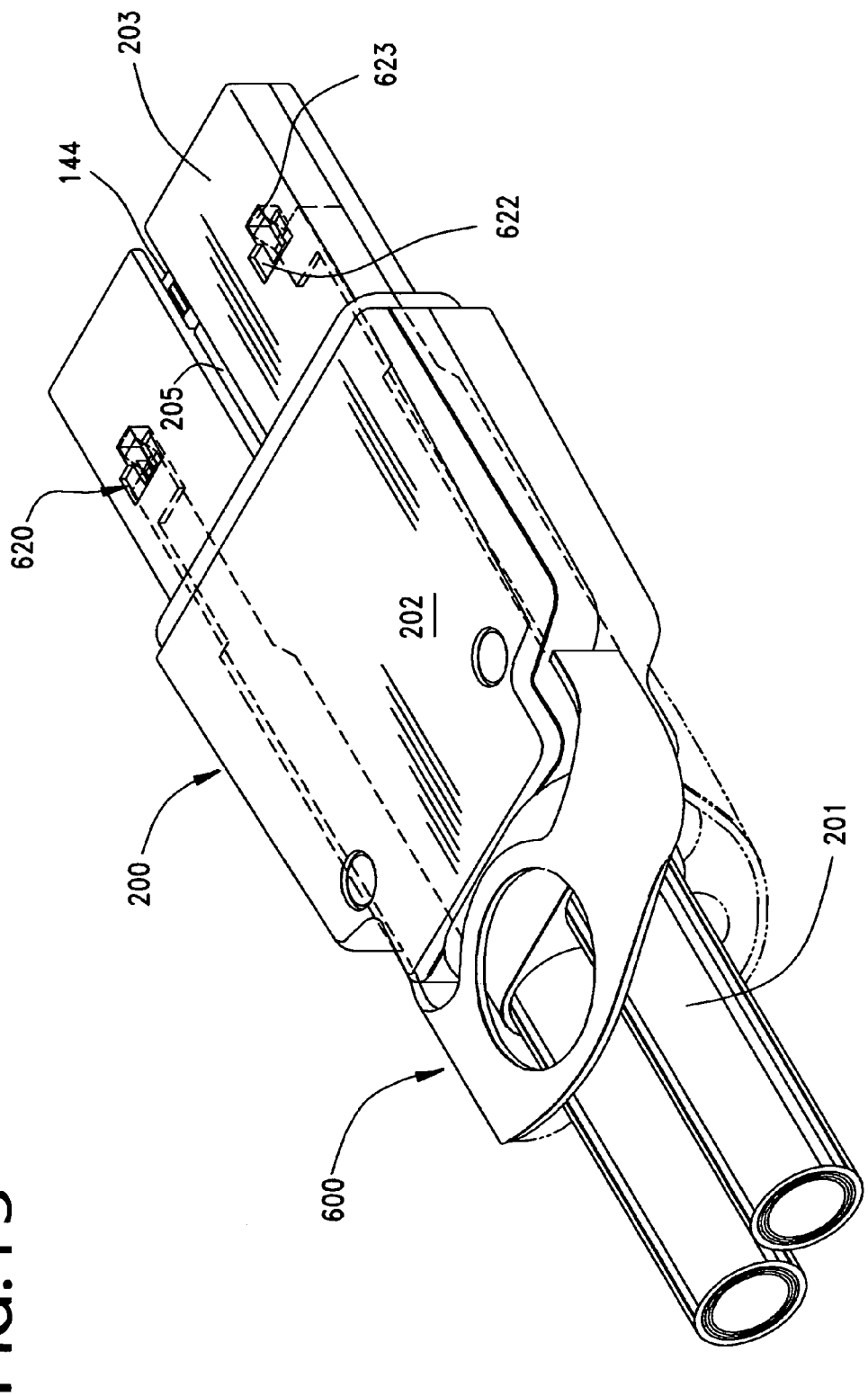
FIG. 13 is a perspective view of a plug connector incorporating a delatching mechanism constructed in accordance with the principles of the present invention.

FIG. 13 illustrates the plug connector 200 with a delatching mechanism 600 constructed in accordance with the principles of the present invention. As best seen in FIG. 14, the delatching mechanism 600 includes a base, or handle portion 602 with a hole 604 for a user's finger to fit in and operate the mechanism shown. Two delatching arms 605 extend in a spaced-apart fashion forwardly from the handle portion 602 and the delatching arms 605 terminate in free ends 606. At the free ends 606, two tabs 607 extend inwardly from the delatching arms 605 to define a pair of slide surfaces 607. Each slide surface 607 includes an actuating end 608 which is illustrated as a cam block, or deflection surface 609 having an angled cam surface 610 near the free ends 606. The cam surface 610 is angled downwardly in a direction from the actuating ends 608 toward the handle 602 of the delatching mechanism 600.

Figure 15:
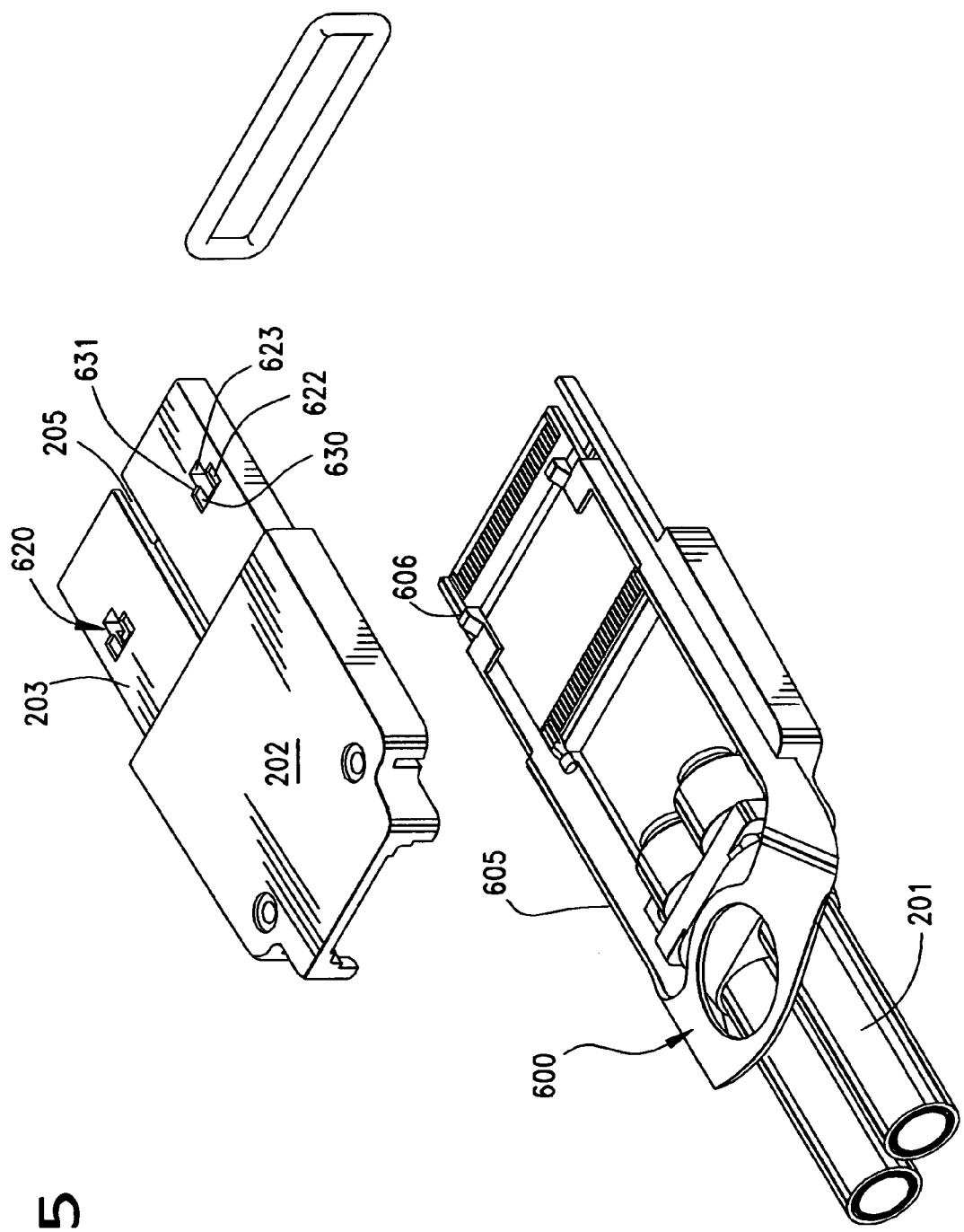
FIG. 15 is an exploded view of the plug connector of FIG. 13.

As shown in FIG. 15, a portion of the delatching mechanism 600 is contained within the plug connector housing 202, specifically the delatching arms 605. The free ends 606 of the delatching arms 605 project out of the connector housing 202 and the entire assembly 600 is slidable longitudinally within the connector housing 202. The delatching arm free ends 606 extend into the forward area of the plug connector and into the area between the conductive shell portions 203 of the plug connector 200. The outer shell 203 of the connector includes a pair of openings 620, shown as T-shaped openings that have a lateral part, or leg portion, 623 and a transverse part, or cap portion, 622. The cam blocks of the latching arms 605 are aligned with these openings 620.

Figure 16A:
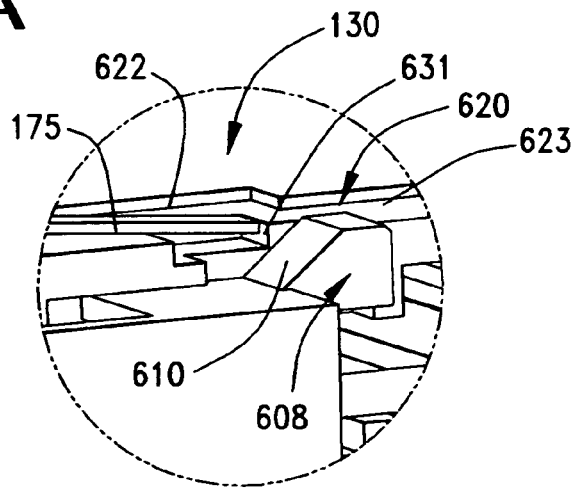
FIG. 16A is an enlarged detail view of the delatching mechanism cam block in place in the plug connector and with the engagement tab of the shielded housing fully engaged with the plug connector.

The cap, or transverse part 622, of these openings 620 act as receptacles for the engagement tabs 175 of the shielded housing as shown best in FIG. 16 A-C. The ends of the engagement tabs fit into these openings 622 and they bear against a bottom surface 630 of the openings 620 (FIG. 16A)

as well as against an end wall 631 thereof. This interference prevents the plug connector 200 from disengaging from the circuit board connector 106 and the shielded housing 130. In order to provide a means for unlatching the plug connector 200 from the shielded housing 130, the cam blocks 609 are aligned with and received within the openings 620, and they typically occupy the leg part 623 of the openings 620. Movement of the delatching mechanism and the cam block will cause contact with the engagement tabs 175 and lift them out of their engagement with the plug connector shell 203.

Figure 16B:
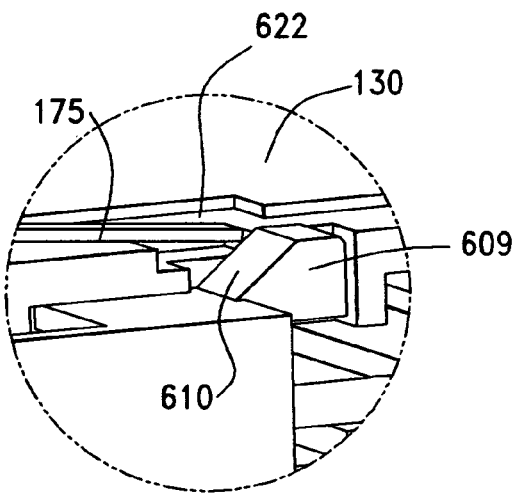
FIG. 16B is the same view as FIG. 16A, but showing the delatching mechanism cam block being moved rearwardly within the plug connector and the shielded housing into contact with the engagement tab thereof.
Figure 16C:
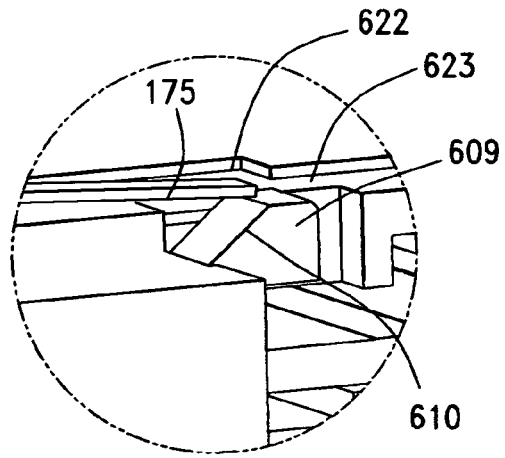
FIG. 16C is the same view as FIG. 16B, but showing the delatching mechanism cam block fully engaged with the engagement tab of the shielded housing; and, FIG. 17 is a perspective view of another embodiment of the present invention.

FIGS. 16A-C also illustrate the serial manner of operation of the latching mechanism. In FIG. 16A, the mechanism is in a first operative position, where the plug connector 200 is latched in engagement with the shielded housing 130. As shown, the end of the engagement tab 175 rests against the inner wall 631 of the opening 620. In FIG. 16B, the delatching mechanism has begun to be moved to its second operative position and the cam block cam surface 610 is confronting the end of the engagement tab 175. In FIG. 16C, the delatching mechanism has been pulled backward so that the cam block 609 and its cam surface 610 have made contact with the end of the engagement tab 175, urging it upwardly within the opening 620 and out of contact with the end wall of the opening 620. In practice the top part of the block preferably extends partially out of the openings 620 so that the lifting of the engagement tabs 175 of the shielded housing 130 is complete.

The handle 602 of the delatching mechanism is shown as extending along one side of the cable 202. It may be extended as shown in dashed line to the other side of the cable 202, or below as shown in FIG. 13. The handle 602 is pulled rearwardly to actuate the delatching arms 605 and disenegage the engagement tabs 175 of the housing from the receptacles of the plug connector.

Figure 17:
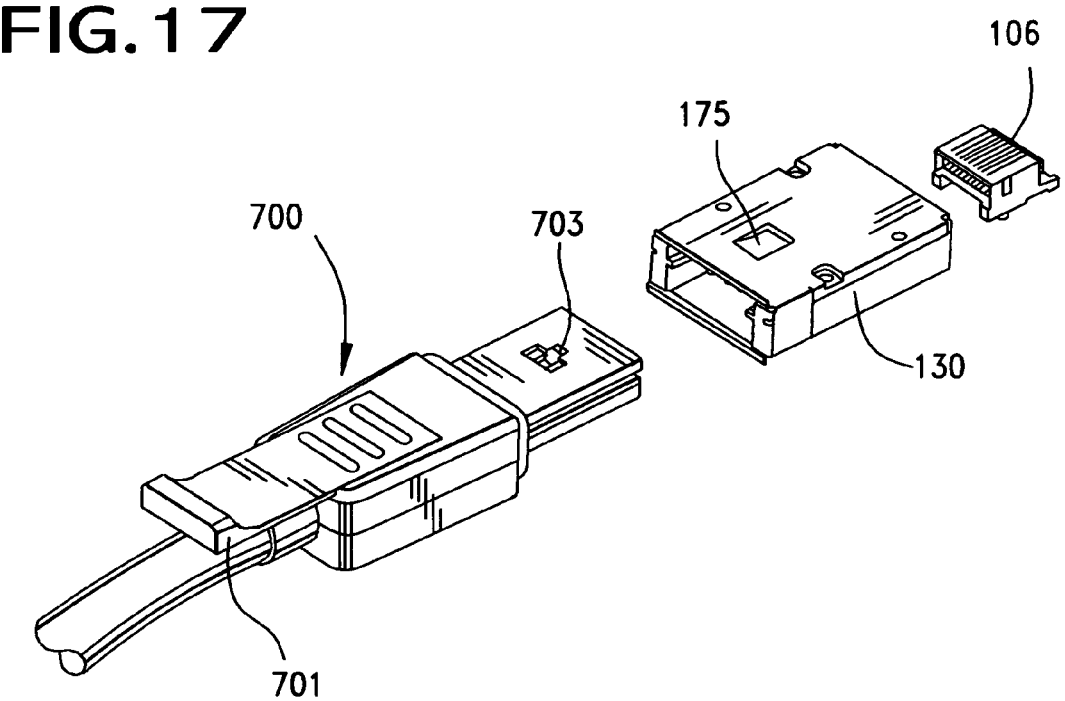

An alternate embodiment is generally shown in FIG. 17 and the handle of this delatching mechanism 700 includes a solid tab 701 that may be drawn rearwardly. In this embodiment, only one delatching arm is used having a single cam block 703 at its free end, and the shielded housing has only a single engagement tab 175 formed therewith.

While the preferred embodiment of the invention have been shown and described, it will be apparent to those skilled in the art that changes and modifications may be made therein without departing from the spirit of the invention, the scope of which is defined by the appended claims.

We claim:

1. A plug connector with a delatching assembly for disengaging the plug connector from a corresponding associated housing, the housing having a pair of engagement tabs that extend into an interior portion of said housing, comprising:
   a connector body portion and a connector mating portion, the mating portion being sized to fit within the housing interior portion, the plug connector having a pair of openings disposed in an upper surface of said mating portion, each opening being aligned with its housing engagement tab, the delatching assembly including a U-shaped actuator with a pair of extended arms that are slidable along a longitudinal axis of said plug connector, each of said arms including a cam block disposed proximate to an end thereof and proximate to the mating portion upper surface, each cam block being aligned with said plug connector opening and said cam block being moveable therewithin into and out of contact with said engagement tab, movement of said detaching mechanism in one direction causing said cam blocks to lift said engagement tab out of said openings and out of engagement with said plug connector; said U-shaped actuator includes a handle portion interconnecting said pair of extended arms together, and said actuator handle portion includes a hole formed therein for receiving an operator's finger; and
   each of said cam blocks is offset inwardly from its said extending arm.

2. The connector of claim 1, wherein said cain blocks each include angled cam surfaces disposed thereon, the angled cam surfaces extending at a rearward angle toward said handle.

3. The connector of claim 1, wherein each of said extended arms includes a flat member that extends inwardly with respect to said extended arms and toward each other, the flat members supporting said cam blocks.

4. The connector of claim 1, wherein said connector body portion includes a pair of spaced apart slots, each of the slots receiving one of said extended arms therein, said slots communicating to the exterior of said connector body portion such that said handle portion is disposed outside of a rearward end of said connector body portion.

5. The plug connector of claim 1, wherein said openings include T-shaped openings, each including a transverse cap portion and a lateral leg portion generally intermediate said transverse cap portion.

6. The plug connector of claim 5, wherein said engagement tabs engage said transverse cap portion of the T-shaped openings during engagement of the plug connector with the housing, and wherein said cam blocks of the arms occupy said lateral leg portions of the T-shaped openings during said movement of the delatching mechanism to lift the engagement tabs out of engagement with said transverse cap portion of the T-shaped openings.

7. A plug connector with a delatching assembly for disengaging the plug connector from a corresponding associated housing, the housing having at least one engagement tab that extends into an interior portion of said housing, comprising:
   a connector body portion and a connector mating portion, the mating portion being sized to fit within the housing interior portion, the plug connector having at least one opening disposed in an upper surface of said mating portion, the opening being aligned with the housing engagement tab, the delatching assembly including an actuator with an extended arm that is slidable along a longitudinal axis of said plug connector, the arm including a cam block disposed proximate to an end thereof and proximate to the mating portion upper surface, the cam block being aligned with said plug connector opening and said cam block being moveable therewithin into and out of contact with said engagement tab, movement of said delatching mechanism in a first direction causing said cam block to lift said engagement tab out of said opening and out of engagement with said plug connector; and
   said connector mating portion includes an opening disposed therein for receiving said housing engagement tab when said connector is engaged with said housing, said connector mating portion further including a stop surface for contacting said housing engagement tab.

8. The connector of claim 7, wherein said connector mating portion includes a recess and said opening communicates with said recess, said actuator cam blocks being movable within said recess between first and second operative positions.

9. The connector of claim 8, further including a slot that communicates with said recess and said opening, said cam block being movable within said slot between said first and second operative positions.

10. A plug connector for engaging a corresponding associated housing, the housing having a pair of engagement tabs disposed thereon that extend into an interior portion of said housing for engaging the plug connector when inserted into said housing and for retaining said plug connector in place within said housing, said plug connector comprising:

a connector body portion and a connector mating portion, the connector mating portion being sized to fit within the housing interior portion, said connector mating portion including an upper surface, a pair of spaced-apart openings disposed in the mating portion upper surface, each one of the openings including T-shaped openings and being aligned with one of said housing engagement tabs when said plug connector is inserted into said housing such that said engagement tabs extend into said T-shaped openings and engage same when said plug connector is inserted into said housing; and, means for disengaging said plug connector from engagement with said housing, the disengagement means including an actuator including a handle portion and two elongated rails extending longitudinally from the handle portion, a cam block disposed proximate to a free end of each of said rails thereof, the cam blocks being slidable within said connector mating portion T-shaped openings, whereby movement of said actuator in a first direction moves said cam blocks into contact with said respective engagement tabs and lifts said engagement tabs out of engagement with said T-shaped openings thereby permitting said plug connector to be removed from said housing, and movement of said actuator in a second direction moves said cam blocks out of contact with said engagement tabs.

11. The plug connector of claim 10, wherein said rails are transversely oriented with respect to said handle portion.

12. The plug connector of claim 11, wherein said connector body portion includes a pair of slots which receive said rails.

13. The plug connector of claim 10, wherein said cam blocks include distinct cam surfaces, the cam surfaces being vertically angled rearwardly downward toward said handle portion.

14. The plug connector of claim 10, wherein said T-shaped openings include a transverse cap portion and a lateral leg portion generally intermediate said transverse cap portion, said engagement tabs extend into said transverse corporation of the T-shaped openings when said plug connector is inserted into said housing, and said cam blocks of the elongated rails occupy said lateral leg portions of the T-shaped openings during said movement of the actuator in the first direction to lift the engagement tabs out of engagement with the transverse cam portion of the T-shaped openings to permit the plug connector to be removed from the housing.

15. The plug connector of claim 10, wherein said cam blocks are offset inwardly of said rails.

16. A plug connector for engaging a corresponding associated housing, the housing having a pair of engagement tabs disposed thereon that extend into an interior portion of said housing for engaging the plug connector when inserted into said housing and for retaining said plug connector in place within said housing, said plug connector comprising:

a connector body portion and a connector mating portion, the connector mating portion being sized to fit within the housing interior portion, said connector mating portion including an upper surface, a pair of spaced-apart openings disposed in the mating portion upper surface, each one of the openings being aligned with one of said housing engagement tabs when said plug connector is inserted into said housing such that said engagement tabs extend into said openings when said plug connector is inserted into said housing;

means for disengaging said plug connector from engagement with said housing, the disengagement means including an actuator including a handle portion and two elongated rails extending longitudinally from the handle portion, a cam block disposed proximate to a free end of each of said rails thereof, the cam blocks being slidable within said connector mating portion openings, whereby movement of said actuator in a first direction moves said cam blocks into contact with said respective engagement tabs and lifts said engagement tabs out of engagement with said openings thereby permitting said plug connector to be removed front said housing and movement of said actuator in a second direction moves said cam blocks out of contact with said engagement tabs; and said connector mating portion includes a pair of recesses disposed in said mating portion upper surface, individual ones of said recesses being associated with individual ones of said openings, said recesses including associated stop surfaces, which said engagement tabs contact when said plug connector mating portion is fully inserted into said housing.

17. The plug connector of claim 16, wherein said cam blocks are slidable within said recesses.

* * * * *